US009936714B2

(12) United States Patent (10) Patent No.: US 9,936,714 B2
Hull et al. (45) Date of Patent: Apr. 10, 2018

(54) FORMULATIONS FOR STABILIZING MOISTURE IN MUSCLE FOODS

(71) Applicant: IsoAge Technologies LLC, Athens, GA (US)

(72) Inventors: Richard Hull, Athens, GA (US); Mo Toledo, Hull, GA (US); Romeo Toledo, Hull, GA (US)

(73) Assignee: ISOAGE TECHNOLOGIES LLC, Athens, GA (US)

( * ) Notice: Subject to any disclaimer, the term of this patent is extended or adjusted under 35 U.S.C. 154(b) by 504 days.

(21) Appl. No.: 14/464,566

(22) Filed: Aug. 20, 2014

(65) Prior Publication Data

US 2015/0079269 A1 Mar. 19, 2015

Related U.S. Application Data

(60) Provisional application No. 61/867,862, filed on Aug. 20, 2013.

(51) Int. Cl.
*A23B 4/20* (2006.01)
*A23L 13/70* (2016.01)
*A23L 13/40* (2016.01)

(52) U.S. Cl.
CPC ............... *A23B 4/20* (2013.01); *A23L 13/72* (2016.08); *A23L 13/428* (2016.08); *A23V 2002/00* (2013.01)

(58) Field of Classification Search
CPC . A23B 4/12; A23L 13/72; A23L 27/82; A23L 27/13; A23L 13/428; A23L 3/3508

USPC ................ 426/652, 641, 246, 332
See application file for complete search history.

(56) References Cited

U.S. PATENT DOCUMENTS

| 4,937,092 | A | 6/1990 | Brotsky et al. |
| 8,092,851 | B2 | 1/2012 | Alam |
| 2010/0310738 | A1 | 12/2010 | Ludwig |
| 2012/0027899 | A1 | 2/2012 | Topps |
| 2012/0201950 | A1 | 8/2012 | Toledo |
| 2013/0267603 | A1 | 10/2013 | Hull et al. |

FOREIGN PATENT DOCUMENTS

JP S61239865 A 10/1986

OTHER PUBLICATIONS

PCT International Search Report from PCT/US14/51936, dated Jan. 12, 2015.
Plum Good News, California Dried Plums, The Sensational Superfruit. vol. 1, 2009, pp. 1-2. htttp://www.californiadriedplums.org/industrial/products/juice-concentrate.
Yildiz-Turp, "Effets of using plum puree on some properties of low fat beef patties", Meat Science, 2010, pp. 896-900, abstract.
Supplemental European Search Report in EP Application No. 14838034, dated May 10, 2017.
Partial European Search Report in EP Application No. 14838034, dated Feb. 7, 2017.

*Primary Examiner* — Vera Stulii

(74) *Attorney, Agent, or Firm* — Stroock & Stroock & Lavan, LLP

(57) ABSTRACT

Compositions and methods for stabilizing moisture in muscle foods using natural, phosphate-free ingredients are described.

20 Claims, No Drawings

FORMULATIONS FOR STABILIZING MOISTURE IN MUSCLE FOODS

RELATED APPLICATIONS

This application claims the benefit of, and priority to, U.S. Provisional Application No. 61/867,862, filed Aug. 20, 2013, which is incorporated herein by reference in its entirety.

BACKGROUND

Juiciness and tenderness are quality attributes of muscle foods that are highly discriminated by consumers in judging a quality muscle food product. These attributes are very highly dependent on the amount of water in the muscle at the time the food is consumed. All processing steps in the conversion of a live animal muscle into an edible product create a stress factor which results in the loss of moisture from the muscle in the form of "drip" in frozen and thawed products, "purge" in raw meats stored under refrigeration, and in cooking loss when the raw muscle is heated prior to serving. In the case of "ready to eat" meats, moisture loss is particularly egregious since there will be no further chance of introducing additional moisture such as simmering in a sauce or addition of gravy prior to serving.

Improved methods for minimizing moisture loss in muscle food products are needed.

SUMMARY

The present invention is related to formulations for stabilizing moisture in muscle foods, such as meat, poultry and seafood, and methods for making the same. The formulations have a predetermined pH and/or ionic strength, and can function to solubilize muscle proteins. In preferred embodiments, formulations according to the present invention are phosphate-free and/or contain all natural ingredients.

In one aspect, the invention provides a phosphate-free composition for stabilizing moisture in muscle foods, prepared from lemon juice and vinegar, comprising acetate salt and citrate salt in an aqueous solution having a pH greater than 7.5 and an ionic strength greater than 0.2.

In some embodiments, the composition comprises sodium acetate, potassium acetate, sodium citrate, and potassium citrate.

In some embodiments, the composition comprises 5 parts of an equal mix of sodium acetate and potassium acetate to 1 part of an equal mix of sodium citrate and potassium citrate.

In some embodiments, the composition comprises 10 parts of an equal mix of sodium acetate and potassium acetate to 1 part of an equal mix of sodium citrate and potassium citrate.

In some embodiments, the acetate salt comprises 300 grain vinegar neutralized with a neutralizing agent comprising sodium bicarbonate and potassium bicarbonate.

In some embodiments, the citrate salt comprises 400 gpl lemon concentrate neutralized with a neutralizing agent comprising sodium bicarbonate and potassium bicarbonate.

In some embodiments, the composition has an ionic strength of 0.2 to 0.5.

In some embodiments, the composition has a pH of 8.5 to 9.8.

In some embodiments, the composition has a pH of 9.0±0.3.

Additional features and advantages of the present invention are described further below. This summary section is meant merely to illustrate certain features of embodiments of the invention, and is not meant to limit the scope of the invention in any way. The failure to discuss a specific feature or embodiment of the invention, or the inclusion of one or more features in this summary section, should not be construed to limit the invention.

DETAILED DESCRIPTION

Moisture is lost from muscle foods primarily because of protein denaturation. The helical structure of a protein molecule permits the entrapment of water in the helical protein structure and the twists and turns in the helix further create additional spaces within the molecule to hold water. However, denaturation of proteins is a process where the helical primary structure unfolds, thereby eliminating the spaces in the native protein structure, and hydrophobic bonds are formed between adjacent protein molecules to cause them to attach to each other, further eliminating space for water molecules and "squeezing" water out of the molecule. Thus, moisture stabilizing agents can be used to act as "stents" separating adjacent molecules from each other and minimize the squeezing effect as the protein molecule aggregation process is minimized.

Over the last 50 years, food processors have found the usefulness of phosphates in ajuvenating the texture of protein foods. The Food and Drug Administration (FDA) lists several phosphate additives including sodium acid pyrophosphate, tetrasodium pyrophosphate, and sodium tripolyphosphate as GRAS (Generally Regarded as Safe) in Code of Federal Regulations, Title 21, Part 121, paragraph 121.101 (D). The U.S. Department of Agriculture (USDA), in addition, has allowed several phosphate types to decrease the amount of cooked out juices in various cooked meat products in Code of Federal Regulations Title 9 Paragraph 318.7(4). Phosphates are also used widely in fish and shellfish. Some advantages of treating fish and shellfish with phosphates include improvements in color, texture and taste.

In spite of the allowance by the U.S. regulatory agencies of the use of phosphates in muscle foods, there has been a growing trend of consumers rejecting products that declare phosphates on the label. Some adverse physiological effects have been reported in animal studies (e.g., R. H. Ellinger's book *Phosphates as Food Ingredients*, CRC Press 1971, which described kidney damage and calcification of soft tissues as adverse effects of excess phosphates in the diet of laboratory animals). Although no such effects have been reported in humans, there are consumers who are concerned and/or who are very sensitive to phosphates (e.g., in whom contact of a phosphate muscle food with the tongue can elicit an astringent response and a dryness in the mouth and throat which persists long after the food is swallowed).

Because of these potentially adverse responses by consumers on examining food labels and in consumption of phosphate treated food, food processors have been looking for an alternative to phosphates as a means of stabilizing moisture in food. A recent action by the European Union banning the importation into the European Union of phosphate-treated scallops and shrimp is another motivation for the industry to look for alternatives to the use of phosphates in stabilizing moisture in muscle foods.

Several phosphate replacers have been advertised in the trade magazines. For meats and poultry, existing formulations have involved the use of starches and hydrocolloids as a component of marinades injected into the whole muscle.

The mode of action of this type of formulation is a retention of fluids by the starch or hydrocolloid in the muscle, and there is no effect on the protein itself. These effects are in contrast to the action of phosphates, which promote salt soluble protein extraction and act as a "stent" preventing the aggregation of denatured muscle protein.

Formulations that can minimize the aggregation of denatured muscle protein and/or enhance the solubilization of myofibrillar proteins in a manner similar to phosphates, but which are phosphate-free and do not have the negative features associated with phosphates, are needed in the art.

Embodiments of the present invention identify that: (1) an elevated alkaline pH; and (2) an increase in ionic strength, are both individually and in combination, important factors that promote and permit relatively greater amount of myofibrillar protein solubilization, thereby increasing the ability of proteins to prevent muscle from exuding water. The solubility of proteins in an aqueous solution is a function of pH. At pH higher than the isoelectric point of the protein, solubility increases with an increase in pH. Similarly, the solubility of proteins also increases with an increase in ionic strength up to a point when excessive salts dehydrate the protein leading to aggregation. Thus, formulations according to the present invention preferably have an alkaline pH (e.g., a pH of about 7.5 to 11.0, preferably about 8.5 to 9.8) and include salts adequate to elevate the ionic strength to a range of about 0.2 to 1.0 (preferably about 0.2 to 0.5).

Another trend in the food industry is the increasing number of consumers who read food product labels and increasing awareness of these consumers of components having health benefits and those which might have adverse long term health effects. The ideal label statement must not only be truthful, but also would be perceived as healthful. Another trend in the industry is the use of ingredients which consumers are already familiar with, such as those commonly seen in household kitchens. Label statements with minimal declared components would be considered as "clean label" and "consumer friendly". Thus, formulations according to the present invention preferably support a "clean and consumer friendly" label statement.

In some embodiments, plum juice concentrate may be used in addition to or in place of lemon in the formulations. Plums or the dried form, prunes, are distingushable among the fruits because of their high concentration of the sugar alcohol, sorbitol. Sorbitol is a hexa poly-ol, where one hydroxyl group (—OH) is attached to each of the six carbons in the glucose molecule. It is highly hydrophilic and binds very well with proteins. The acidity of plum juice is relatively low compared to that of lemon therefore there is no need to neutralize the acid when used in the formulations. Plum concentrates also contain a high concentration of soluble fibers that has a very high water holding capacity. The well-known mild laxative activity of prune juice can be attributed to the ability of the fibers to retain water and when combined with the hydrophilic nature of the alcohol sugar, it is very effective in loosening the bolus for easy transport through the gut in the lower large intestines of the human body. Plum juice also has some protein which contributes to the water holding capacity. The combination of hydrophilic components with high affinity for proteins, other high water holding capacity components in a high pH environment surrounding proteins, and high ionic strength results in an effective system for stabilizing moisture in muscle foods.

Some embodiments of the invention comprise formulations that permit the use of only two ingredients on the label: vinegar and lemon juice. Both these components are very familiar to consumers. In some embodiments, in order to raise the pH to the alkaline range, both the vinegar and the lemon juice are neutralized with a neutralizing agent. Vinegar is neutralized to near neutral pH (e.g., pH 6.7-7.0). Adding an excess of the neutralizing agent to obtain a pH greater than 7.0 is not preferred, as it would result in the precipitation of the excess neutralizing agent on standing, leaving an impression to the user that the product is not homogeneous and the product composition could vary when different portions of a container containing the product is removed for use in a process. The lemon juice is also neutralized, preferably to a pH of 7.0. Since in some embodiments the salt in the completely neutralized lemon juice is trisodium citrate and a 1% w/v solution of this salt in water has a pH around 7.8, ending the neutralization process at a pH of 7.0 is preferred, as it would leave a small amount of the last carboxylic acid moiety in the citrate molecule as un-neutralized, thus avoiding having an excess of neutralizing agent in the neutralized lemon.

A variety of neutralizing agents may be used. In certain embodiments, the neutralizing agent is a mixture of sodium bicarbonate and potassium bicarbonate. The use of two bicarbonate salts, and in particular potassium bicarbonate, avoids the crystallization of sodium acetate or sodium citrate on storage. Crystallization is to be avoided not only because it creates the appearance of non-homogeneity, but also because salt crystals removed from solution no longer contribute to the ionic strength, thus impairing the functionality of the product for protein solubilization. Use of potassium bicarbonate also reduces the sodium levels in the product making the product suitable for low sodium formulations desired by product developers for consumer products. The mixture may comprise, for example, 10-90% sodium bicarbonate with the balance (to 100%) comprising potassium bicarbonate. In some embodiments, the neutralizing agent comprises equal parts sodium bicarbonate and potassium bicarbonate.

In some embodiments, the formulation is a solution that has a pH of 7.5-9.5 and consists of about 5 parts neutralized vinegar to about 1 part neutralized lemon, for use on meat, poultry and seafood products. In other embodiments, the formulation is a solution that has a pH 8.5-11.0 and consists of about 10 parts neutralized vinegar to about 1 part neutralized lemon, for less flavor impact.

The ionic strength of a solution is the sum of the product of the molar concentration of ionic species in the solution multiplied by the square of the ionic charge. If $C_i$ is the molar concentration of ionic species i, and $Z_i$ is the charge of ionic species i, then:

$$\text{Ionic Strength} = 0.5 \Sigma (C_i * Z_i^2).$$

In the illustrative formulations described herein, comprising neutralized vinegar and neutralized lemon, each neutralized with a mixture of sodium bicarbonate and potassium bicarbonate, the following ionic species exist: $Na^{+1}$, $K^{+1}$, $(Acetate)^{-1}$, and $(Citrate)^{-3}$.

Both sodium and potassium acetate are derived from the acetic acid in vinegar. Both potassium and sodium citrate are derived from the citric acid in the lemon component. In some embodiments, the concentrated form of the acetic acid is 300 grain vinegar. In some embodiments, the concentrated form of the citric acid is 400 gpl lemon concentrate. Formulations using such concentrated forms have been determined by the Applicants to possess adequate ionic strength to facilitate solubilization of myofibrillar proteins in muscle when combined with the high pH of the solution.

By experimentation and observations on precipitation of unsolubilized salts, Applicants found that adding enough water to lower the vinegar concentration from 300 grain to 185 grain can give the storage stability needed to prevent crystallization and precipitation of undissolved salts.

The amount of water preferably added to the mixture of neutralized vinegar and neutralized lemon can be based on the amount of vinegar used in the formulation. For every 100 pounds of vinegar that was neutralized and used in making the formulation, the amount of water can be calculated as follows:

Water added=[(100*0.3)/0.185]−100.

In certain exemplary embodiments, an all-natural phosphate replacer (NPR) according to the present invention may be prepared as follows.

Formula:

Vinegar, 300 grain (30% w/v or 28.8% w/w acetic acid)= 100 lbs

Neutralizing agent Potassium Bicarbonate=25 to 30 lbs
Neutralizing agent Sodium Bicarbonate=25 to 30 lbs
Water=62.2 lbs
Neutralized lemon=37.2 lbs Neutralize 100 lbs vinegar using 20.04 to 22.82 lbs potassium bicarbonate and the same amount of sodium bicarbonate. pH should not exceed 7.0 and neutralized solution should not contain any precipitate of undissolved sodium bicarbonate and potassium bicarbonate. There should be about 185.8 lbs of neutralized vinegar. Set aside.

Neutralize 31 lbs of 400 gpl lemon concentrate using 3.425 lbs each of sodium bicarbonate and potassium bicarbonate. Filter if necessary and desired to remove any suspended matter. There should be 37.2 lbs of neutralized lemon concentrate. Set aside.

Prepare pH adjuster by heating 62.2 lbs water to 90° C. and adding 5 lbs each of sodium bicarbonate and potassium bicarbonate. Mix until all salts have dissolved. Solution should be clear. Cool to room temperature.

Mix neutralized vinegar, neutralized lemon concentrate, and pH adjuster. Measure pH after 2 hours of mixing. pH should be 8.7±0.3.

Differences in the structure, composition and natural pH of seafood such as scallops and shrimp from those of meats have been found to require a higher pH for the phosphate replacer to be effective for seafood. It has been determined that the pH for the phosphate replacer for seafood should be at least 8.5, preferably at least 9.0.

In other exemplary embodiments, a high-pH NPR according to the present invention may be prepared as follows.

Formula:

Vinegar, 300 grain (30% w/v or 28.8% w/w acetic acid)= 100 lbs

Neutralizing agent Potassium Bicarbonate=25 to 30 lbs
Neutralizing agent Sodium Bicarbonate=25 to 30 lbs
Water=62.2 lbs
Neutralized lemon=18.6 lbs Neutralize 100 lbs vinegar using 20.04 to 22.82 lbs potassium bicarbonate and the same amount of sodium bicarbonate. Preferably, pH should not exceed 7.0 and neutralized solution should not contain any precipitate of undissolved sodium bicarbonate and potassium bicarbonate. There should be 185.8 lbs of neutralized vinegar. Set aside.

Neutralize 15.5 lbs of 400 gpl lemon concentrate using 3.425 lbs each of sodium bicarbonate and potassium bicarbonate. Filter if necessary to remove any suspended matter. There should be 18.6 lbs of neutralized lemon concentrate. Set aside.

Prepare pH adjuster by heating 62.2 lbs water to 90° C. and adding 5 lbs each of sodium bicarbonate and potassium bicarbonate. Mix until all salts have dissolved. Solution should be clear. Cool to room temperature.

Mix neutralized vinegar, neutralized lemon concentrate and pH adjuster. Measure pH after 2 hours of mixing. pH should be 9.3±0.3.

While there have been shown and described fundamental novel features of the invention as applied to preferred and exemplary embodiments thereof, it will be understood that omissions and substitutions and changes in the form and details of the disclosed embodiments of the invention may be made by those skilled in the art without departing from the spirit of the invention. Moreover, as is readily apparent, numerous modifications and changes may readily occur to those skilled in the art. Hence, it is not desired to limit the invention to the exact construction and operation shown and described and, accordingly, all suitable modification equivalents may be resorted to falling within the scope of the invention as claimed. It is the intention, therefore, to be limited only as indicated by the scope of the claims appended hereto.

FURTHER EXAMPLES

Example 1: Fresh and Frozen Scallops

Table 1 shows test results for fresh and frozen scallops (and an equal mix of the two) treated with either sodium tripolyphosphate (STP) or an All Natural Phosphate Replacer (NPR) according to an embodiment of the present invention. JTFS refers to fresh scallops obtained from JT Sea Products. ACF refers to frozen scallops obtained from Atlantic Capes Fisheries, Inc. Moisture retention was measured at 24, 48, and 72 hours.

TABLE 1

| Test ID | Description | Weight (lb) | | | | Pick-up (%) | | |
|---|---|---|---|---|---|---|---|---|
| | | Initial | 24 Hr | 48 Hr | 72 Hr | 24 Hr | 48 Hr | 72 Hr |
| 1A | JTFS Fresh Scallops | 5.25 | 5.70 | 6.33 | 6.73 | 8.60 | 20.57 | 28.19 |
| 1B | JTFS Fresh Scallops (STP) | 5.25 | 6.10 | 6.55 | 6.90 | 16.19 | 24.76 | 31.43 |
| 1C | JTFS Fresh Scallops (NPR) | 5.25 | 6.05 | 6.70 | 6.92 | 15.24 | 27.62 | 31.81 |
| 2A | ACF Frozen Scallops | 5.20 | 5.84 | 6.31 | 6.38 | 12.31 | 21.35 | 22.69 |
| 2B | ACF Frozen Scallops (STP) | 5.20 | 5.95 | 6.60 | 6.70 | 14.42 | 26.92 | 28.85 |
| 2C | ACF Frozen Scallops (NPR) | 5.20 | 6.10 | 6.65 | 6.70 | 17.1 | 27.88 | 28.85 |
| 3A | JTFS & ACF mix | 10.00 | 10.85 | 11.50 | 12.21 | 8.50 | 18.90 | 22.10 |
| 3B | JTFS & ACF mix (STP) | 10.00 | 12.10 | 13.50 | 12.75 | 21.00 | 30.50 | 27.50 |
| 3C | JTFS & ACF mix (NPR) | 10.00 | 12.05 | 13.95 | 12.75 | 20.05 | 39.50 | 27.50 |

The treatments above were as follows:
Treatment 1A: Fresh Scallops in a 2% Salt Solution (NaCl)
Treatment 1B: Fresh Scallops in a 5% Sodium Tripolyphosphate Solution
Treatment 1C: Fresh Scallops in a 5% All Natural Phosphate Replacer Solution pH 8.5
Treatment 2A: Frozen Scallops in a 2% Salt Solution (NaCl)
Treatment 2B: Frozen Scallops in a 5% Sodium Tripolyphosphate Solution
Treatment 2C: Frozen Scallops in a 5% All Natural Phosphate Replacer Solution pH 8.5
Treatment 3A: Mix of Fresh and Frozen Scallops in a 2% Salt Solution (NaCl)
Treatment 3B: Mix of Fresh and Frozen Scallops in a 5% Sodium Tripolyphosphate Solution
Treatment 3C: Mix of Fresh and Frozen Scallops in a 5% All Natural Phosphate Replacer Solution pH 8.5

Example 2: Uncooked Seasoned Pot Roast of Beef

A fresh USDA Choice chuck roll was trimmed and diced to 3"×3" as follows: (1) Confirm the fat cap is less than ¼"; (2) Run through Graselli KSL set at 4 high; (3) Run through Carruthers set at 3" by 3", 4" high maximum or "Natural Height".

Brine was prepared by adding a meat and poultry All Natural Phosphate Replacer (NPR) of pH 8.5 to water, and adding turbinado sugar and salt. A control brine was prepared using a 5% sodium tripolyphosphate solution instead of the NPR.

Additional ingredients included Individually Quick Frozen (IQF) onions (½" dice) and Pot Roast Seasoning (Fuchs 61390-1).

The brine was injected into the meat at 7%. The meat was transferred to a vacuum tumbler, where it was mixed under vacuum (20 PSI) for 5 minutes. The seasoning and onions were then added in and mixed under vacuum (20 PSI) for 5 minutes. The meat was then divided into 6 lb portions in Cooking Bags (MQ 85 from M&Q Packaging Corporation), sealed, and subjected to a blast freeze.

No difference in cook yield was found between the control product with phosphate and the test product with natural phosphate replacer (68% yield for both products).

Example 3: Fresh Scallops

Table 2 shows test results for fresh scallops (J&T Scallops) treated as indicated. Moisture retention was measured at 24, 48, and 72 hours.

TABLE 2

| Test | Weight (lb) | | | | Pick-up (%) | | |
|---|---|---|---|---|---|---|---|
| | Initial | 24 Hr | 48 Hr | 72 Hr | 24 Hr | 48 Hr | 72 Hr |
| Water only | 4.00 | 4.45 | 4.60 | 4.70 | 11.25 | 15.00 | 17.50 |
| 2% Salt Solution (NaCl) | 4.00 | 5.11 | 5.49 | 5.72 | 27.75 | 37.25 | 43.00 |
| All Natural Phosphate Replacer | 4.00 | 5.11 | 5.49 | 5.72 | 44.25 | 50.00 | 57.50 |
| All Natural Phosphate Replacer + 2% Salt | 4.00 | 6.00 | 6.25 | 6.35 | 50.00 | 56.25 | 58.75 |
| A&B Tripolyphosphate Blend | 4.00 | 5.75 | 6.05 | 6.25 | 43.75 | 51.25 | 56.25 |
| A&B Tripolyphosphate Blend + 2% Salt | 4.00 | 5.90 | 6.25 | 6.40 | 47.50 | 56.25 | 60.00 |

Table 3 shows the contents of each of the treatment solutions. Water was Reverse Osmosis (RO) purified, deionized (DI) water. A&B Tripolyphosphate Blend was obtained from A&B Chemical Co. All Natural Phosphate Replacer (NPR) was a natural phosphate replacer formulation according to an embodiment of the present invention, having a pH of 9.5.

TABLE 3

| | Ingredients (lb) | Water (lb) | Ice (lb) |
|---|---|---|---|
| Water only | | 6.25 | 2.25 |
| 2% Salt Solution | 0.17 Salt | 6.25 | 2.25 |
| All Natural Phosphate Replacer | 0.2 NPR | 6.25 | 2.25 |
| All Natural Phosphate Replacer + 2% Salt | 0.2 NPR, 0.17 Salt | 6.25 | 2.25 |
| A&B Tripolyphosphate Blend | 0.2 Phosphate | 6.25 | 2.25 |
| A&B Tripolyphosphate Blend + 2% Salt | 0.2 Phosphate, 0.17 Salt | 6.25 | 2.25 |

Example 4: Fresh Scallops

Table 4 shows results of soaking fresh scallops in a solution that contains vinegar buffered to a pH of 6.0 and plum juice concentrate at different levels.

In Test 1, the soak solution contains deionized water, 2.5% plum juice concentrate. In Test 2 the soak solution was deionized water containing 5.0% plum juice concentrate. In Test 3, the soak solution contained 2.5% plum concentrate and 2.5% 300 grain vinegar buffered to a pH of 6.0 and in Test 4, the soak solution contained 5.0% plum juice concentrate and 2.5% 300 grain vinegar buffered to pH of 6.0. In Test 5, the soak solution was deionized water containing a mixture of citrate salts now used in the seafood industry for soaking scallops prior to freezing.

Table 4

TABLE 4

| Test # | green wt (g) | 24 hr weight (g) | Weight gain (%) |
|---|---|---|---|
| 1 | 22.59 | 31.81 | 40.8 |
| 2 | 22.54 | 29.95 | 32.9 |
| 3 | 22.67 | 30.33 | 33.8 |
| 4 | 22.65 | 28.98 | 27.9 |
| 5 | 22.63 | 26.96 | 19.1 |

The plum juice concentrate solution at 2.5% out-performed all the other test solutions including Test 2 which contained 5.0% plum juice concentrate. The combined buffered 300 grain vinegar and plum juice concentrate at 2.5% each ranked second in terms of weight gain. These results indicate that the acidity of the soak solutions due to the higher concentration of the plum juice concentrate and the acetic acid in the buffered 300 grain vinegar could decrease water holding by scallops.

What is claimed is:

1. A phosphate-free composition for stabilizing moisture in muscle foods, prepared from lemon juice and vinegar, comprising neutralized vinegar prepared by neutralizing the vinegar with a neutralizing agent comprising two bicarbonate salts to a pH of about 6.7 to about 7.0; neutralized lemon prepared by neutralizing the lemon juice with the neutralizing agent to a pH of about 7.0; and a pH adjuster in an aqueous solution having a pH of about 7.5 to about 11.0 and an ionic strength of about 0.2 to about 1.0.

2. The composition of claim 1, wherein the neutralized vinegar comprises sodium acetate and potassium acetate derived from the acetic acid in the vinegar, and the neutralized lemon comprises sodium citrate and potassium citrate derived from the citric acid in the lemon juice.

3. The composition of claim 1, wherein the composition has a pH of about 7.5 to about 9.5 and comprises about 5 parts neutralized vinegar to about 1 part neutralized lemon.

4. The composition of claim 1, wherein the composition has a pH of about 8.5 to about 11.0 and comprises about 10 parts neutralized vinegar to about 1 part neutralized lemon.

5. The composition of claim 1, wherein the vinegar comprises 300 grain vinegar.

6. The composition of claim 1, wherein the lemon juice comprises 400 gpl lemon concentrate.

7. The composition of claim 1, wherein the composition has an ionic strength of about 0.2 to about 0.5.

8. The composition of claim 1, wherein the composition has a pH of about 8.5 to about 9.8.

9. The composition of claim 1, wherein the composition has a pH of 8.7±0.3.

10. The composition of claim 1, further comprising plum juice concentrate.

11. The composition of claim 1, wherein the neutralizing agent comprises potassium bicarbonate.

12. The composition of claim 1, wherein the neutralizing agent comprises a mixture of sodium bicarbonate and potassium bicarbonate.

13. The composition of claim 1, wherein the neutralizing agent comprises 10-90% sodium bicarbonate with the balance to 100% comprising potassium bicarbonate.

14. The composition of claim 1, wherein the neutralizing agent comprises approximately equal parts sodium bicarbonate and potassium bicarbonate.

15. The composition of claim 1, wherein the composition has a pH of at least about 8.5.

16. The composition of claim 1, wherein the composition has a pH of at least about 9.0.

17. The composition of claim 1, wherein the composition has a pH of 9.3±0.3.

18. The composition of claim 1, wherein the pH adjuster comprises enough water to lower the vinegar concentration to 185 grain.

19. The composition of claim 1, wherein the pH adjuster comprises water, sodium bicarbonate, and potassium bicarbonate.

20. The composition of claim 1, wherein the pH adjuster comprises water and approximately equal parts sodium bicarbonate and potassium bicarbonate.

* * * * *